United States Patent [19]

Slagley

[11] Patent Number: 4,461,022

[45] Date of Patent: Jul. 17, 1984

[54] EXPANDABLE BANDWIDTH COMPRESSION AND RESTORATION SYSTEM

[76] Inventor: Michael W. Slagley, 11661 Flamingo Dr., Garden Grove, Calif. 92641

[21] Appl. No.: 460,892

[22] Filed: Jan. 25, 1983

Related U.S. Application Data

[63] Continuation of Ser. No. 260,260, May 4, 1982, , which is a continuation-in-part of Ser. No. 057,692, Jul. 16, 1979.

[51] Int. Cl.³ .............................................. G10L 1/00
[52] U.S. Cl. ........................................ 381/29; 328/25
[58] Field of Search ................. 179/15.55 R, 15.55 T; 331/25; 364/703; 330/10; 328/25, 30; 307/225 R; 381/29

[56] References Cited

U.S. PATENT DOCUMENTS

| | | | |
|---|---|---|---|
| 3,349,184 | 10/1967 | Morgan | 179/15.55 R |
| 3,582,812 | 6/1971 | Kochi | 328/25 |
| 3,602,824 | 8/1971 | Rusch | 328/25 |
| 3,784,754 | 1/1974 | Hagiwara et al. | 179/15.55 R |
| 4,130,734 | 12/1978 | Lee | 179/1.5 A |

Primary Examiner—E. S. Matt Kemeny
Attorney, Agent, or Firm—G. Donald Weber, Jr.

[57] ABSTRACT

Bandwidth compression using frequency divider is applied to original or heterodyned signals. A bandwidth compressor digitally divides the frequency of information signals by an integer n and impresses amplitude modulation components of the information signals upon the frequency-divided signal. The compressed-bandwidth signal may be expanded and, thereby, restored to a signal approximating the information signals by multiplying the frequency of the compressed signal by the integer n. Fidelity of the compression and reconstruction process is modularly expandable by dividing information signals into a plurality of narrow bandwidth signals, compressing the latter with a plurality of bandwidth compressors as described, summing the compressed signals and reconstructing the information signal with a plurality of bandwidth expanders as described.

25 Claims, 13 Drawing Figures

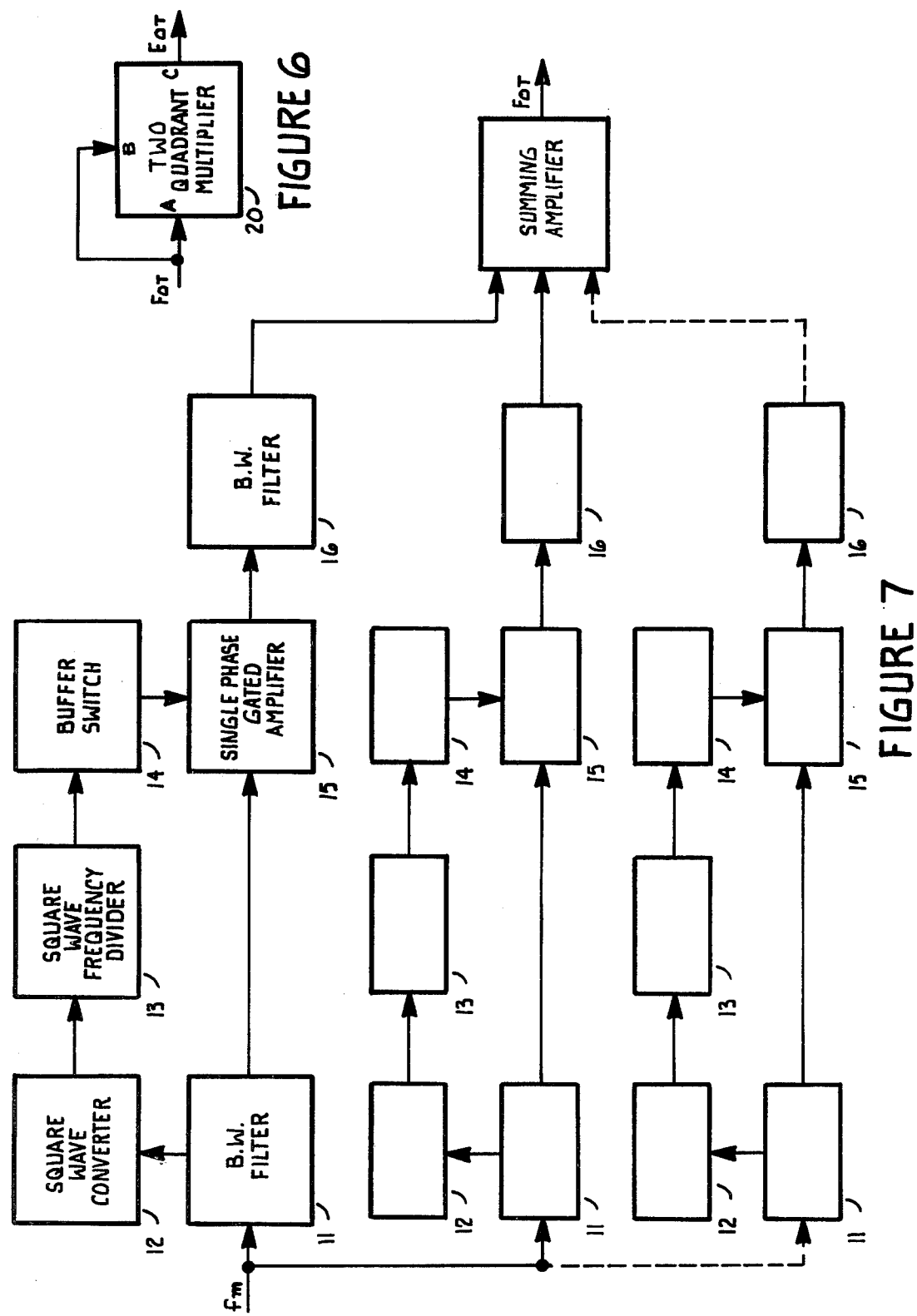

EXPANDABLE BANDWIDTH COMPRESSION AND RESTORATION SYSTEM

This is a continuation, of application Ser. No. 260,260 filed May 4, 1982, which is a continuation-in-part of Ser. No. 057,692 filed July 16, 1979.

BACKGROUND OF THE INVENTION

1. Field of the Invention

This invention relates to methods of increasing the channel capacity of signal transmission systems and more particularly to methods which effect the increase in channel capacity by decreasing the bandwidth requirements for transmitting quasi-periodic signals, thus permitting a larger number of information signals to be carried on a given bandwidth signal transmission channel.

2. Description of the Prior Art

Numerous signal bandwidth reduction methods are disclosed in the prior art, attesting to economic and other advantages afforded by use of such methods. For example, if a telephone communication channel could carry twice as many conversations by using bandwidth compression techniques, the cost per unit telephone could be halved. Additionally, outlays of cash and energy by the communication company can be reduced by requiring fewer channel installations.

Examples of prior-art approaches to bandwidth compression and expansion schemes are exemplified by the following U.S. Pat. Nos. 3,061,684 10/1962 Lancor et al, 3,349,184 10/1967 Morgan, 3,351,710 11/1967 Katagata, 3,510,549 5/1970 Williams, 3,541,266 11/1970 Klayman et al.

Although prior-art bandwidth compression methods are more or less effective in accomplishing their intended purposes, the methods are, for the most part, costly and complex. Accordingly, the presently disclosed bandwidth compression and expansion system was devised to overcome the limitations of previously disclosed systems. The present invention provides methods for dividing the frequency of quasi-periodic analog information signals by an integer factor, transmitting the divided frequency signal over a conventional communication channel not a part of the invention, receiving the signal and frequency multiplying it by the same integer factor to produce reconstruction of the original information signal.

OBJECTS OF THE INVENTION

An object of the present invention is to provide a simple, low-cost bandwidth compression scheme to reduce the bandwidth required for transmitting information signals. Another object is to provide a simple, economical means for expanding a compressed bandwidth signal to its original bandwidth. Another object is to provide a bandwidth compression and expansion system which is modularly expandable to encompass a wider range of information signal frequencies than could a single bandwidth compressor and expander system.

SUMMARY OF THE INVENTION

Briefly stated, the present invention comprehends a bandwidth compressor and bandwidth expander for use with analog electrical information signals. For purposes of illustration, the information signal considered may be an amplitude modulated quasi-sinusoidal signal with a slowly varying fundamental frequency. Such a signal is present in human speech. In operation, the bandwidth compressor clips the information signal to produce a square wave at the fundamental frequency, and digitally divides the square wave by an integer n. The integral division ratio n is preferably a power of 2, to permit division to be accomplished by one or more cascaded flip flops.

The divided frequency square wave is used to alternately gate on and off an amplifier driven by the analog information signal. Thus only selected half cycles of the information signal, time coincident with the "on" time of the gated amplifier, are amplified. The output of the gated amplifier is coupled to the input of a band pass amplifier having a center frequency close to the frequency of the divided square wave corresponding to the predominant frequency of the information signal. The action of the bandpass filter results in an output signal approximating a sinusoidal signal whose fundamental frequency is an integer fraction 1/n of the predominant frequency of the information signal. In another embodiment of the bandwidth compressor, the gated amplifier is replaced with a gated integrator, resulting in a more nearly sinusoidal signal at the output of the bandpass filter.

After transmission, the received compressed bandwidth signal is restored to yield the original information signal by a bandwidth expander, one embodiment of which will now be described. In that embodiment, the quasi-sinusoidal compressed-frequency received signal is coupled to both inputs of a two-quadrant analog multiplier. The output signal from the multiplier contains frequency components twice that of the compressed-frequency signal, i.e., equal to the predominant frequency of the original information signal, if a single frequency divider were used to compress the original signal. Coupling the multiplied-frequency square wave to a bandpass filter tuned to the predominant information signal frequency produces at the output of the filter an approximately sinusoidal, varying-amplitude signal at the predominant information frequency.

If the original signal had been compressed by the factor $2^n$, n such multipliers would be cascaded to comprise the bandwidth expander.

BRIEF DESCRIPTION OF THE DRAWINGS

FIG. 6 is a block diagram of a bandwidth expander.

FIG. 7 is a block diagram of a bandwidth compressor employing a plurality of frequency compression bands.

DETAILED DESCRIPTION OF THE INVENTION

Figure 1:
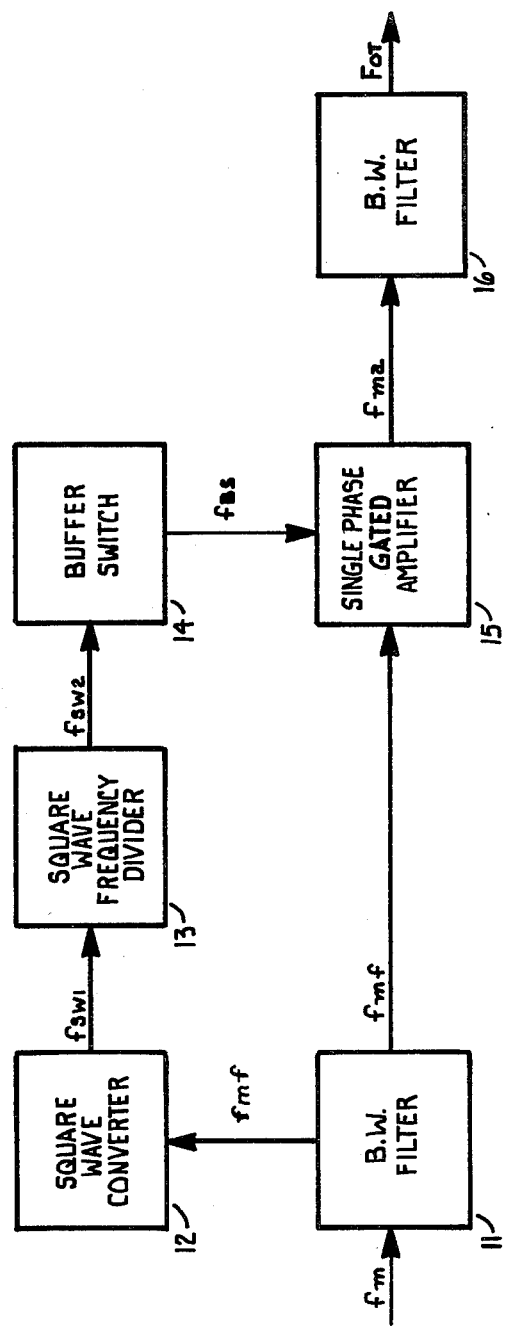
FIG. 1 is a simplified block diagram of the bandwidth compressor.
Figure 3:
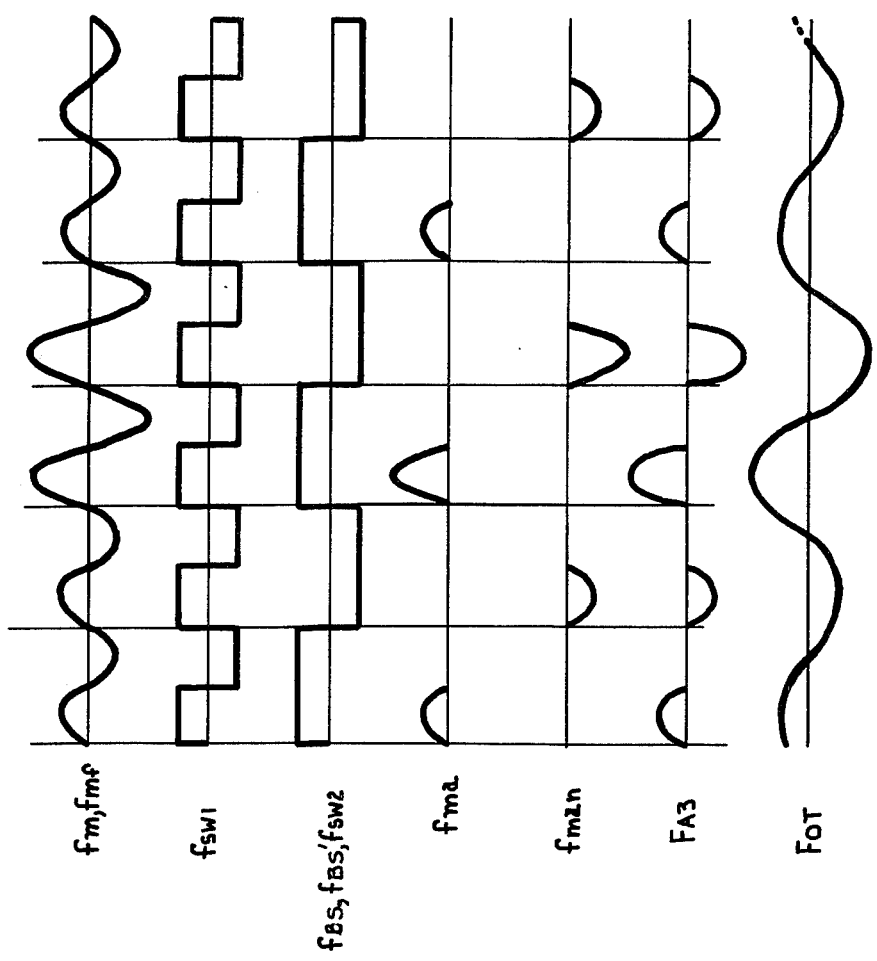
FIG. 3 is a diagram of bandwidth compressor waveforms.

Referring now to FIGS. 1 and 3, an information signal $f_m$ is coupled to the input of bandwidth filter 11. The output signal $f_{mf}$ from filter 11 is coupled to the input of square-wave converter 12. Square wave converter 12 typically employs a Schmitt trigger circuit to produce a bistable signal $f_{sw1}$ at the fundamental frequency of signal $f_{mf}$. Alternatively, the square wave converter 12 may employ other commonly known techniques such as a saturating amplifier or the like to produce a bipolar signal $f_{sw1}$ in synchronization with a quasi-sinusoidal information signal varying in amplitude and/or frequency.

The signal $f_{sw1}$ outputted from the square wave converter is coupled to the input of frequency divider 13. Frequency divider 13 preferably comprises a series configuration of n flip-flops, where n is at least one. Thus the output signal from frequency divider 13 is a square wave $f_{sw2}$ at a frequency equal to the frequency of $f_{sw1}$ divided by $2^n$. For purposes of illustration, n is assumed to be 1, giving a division ratio of 2 and producing the waveform $f_{sw2}$ shown in FIG. 3. Buffer switch 14 receives signal $f_{sw2}$ as an input and produces as an output signal $f_{BS}$ in synchronization with signal $f_{sw2}$, as shown in FIG. 3. Signal $f_{BS}$ is of the proper amplitude to enable gated single-phase amplifier 15 for one discrete level of $f_{BS}$, and disable the amplifier for the other discrete level. During the enabling portion of $f_{BS}$, amplifier 15 linearly amplifies the positive half cycles of filtered information signal $f_{mf}$ which is coupled to the input of the amplifier, producing amplified unipolar signal $f_{ma}$ as shown in FIG. 3. No signal output is produced by amplifier 15 when either the enabling signal is at the disabling level, or the signal $f_{mf}$ is negative. Thus the output signal $f_{ma}$ from gated amplifier 15 comprises a train of positive-going analog signal pulses similar to the positive pulses in signal $f_{mf}$, but occuring only during every other positive signal excursion of $f_{mf}$, i.e., at half the frequency of the positive signal pulses in $f_{mf}$. Signal $f_{ma}$ is applied to the input of bandpass filter 16 which is tuned to the fundamental frequency of $f_{sw2}$. Thus for the example embodiment of FIG. 1, filter 16 is tuned to one half the predominant signal frequency of $f_m$. In general, filter 16 is tuned to a center frequency which is equal to the quotient of the center frequency of filter 11 divided by $\frac{1}{2}^n$. For the specific example of FIG. 1, the signal $f_{of}$ outputted from filter 16 is an amplitude-modulated, quasi-sinusoidal sine wave at half the frequency of the predominant frequency component of information signal $f_m$.

The square wave converter 12, square wave frequency divider 13, and buffer switch 14 are illustrated as three distinct circuits for ease of explanation, and because it would be the preferred mode of operation in most applications. It is possible that all three functions could be performed by a single frequency division circuit such as a flip flop which operated with an input of certain sinusoidal type signals, and whose output keyed the gated amplification circuit on and off directly. If an input signal was of high enough quality, it would be possible to dispense with the initial bandwidth filter. The gated amplifier was described as amplifying only positive going pulses, but amplifying only negative going pulses would work similarly.

Figure 2:
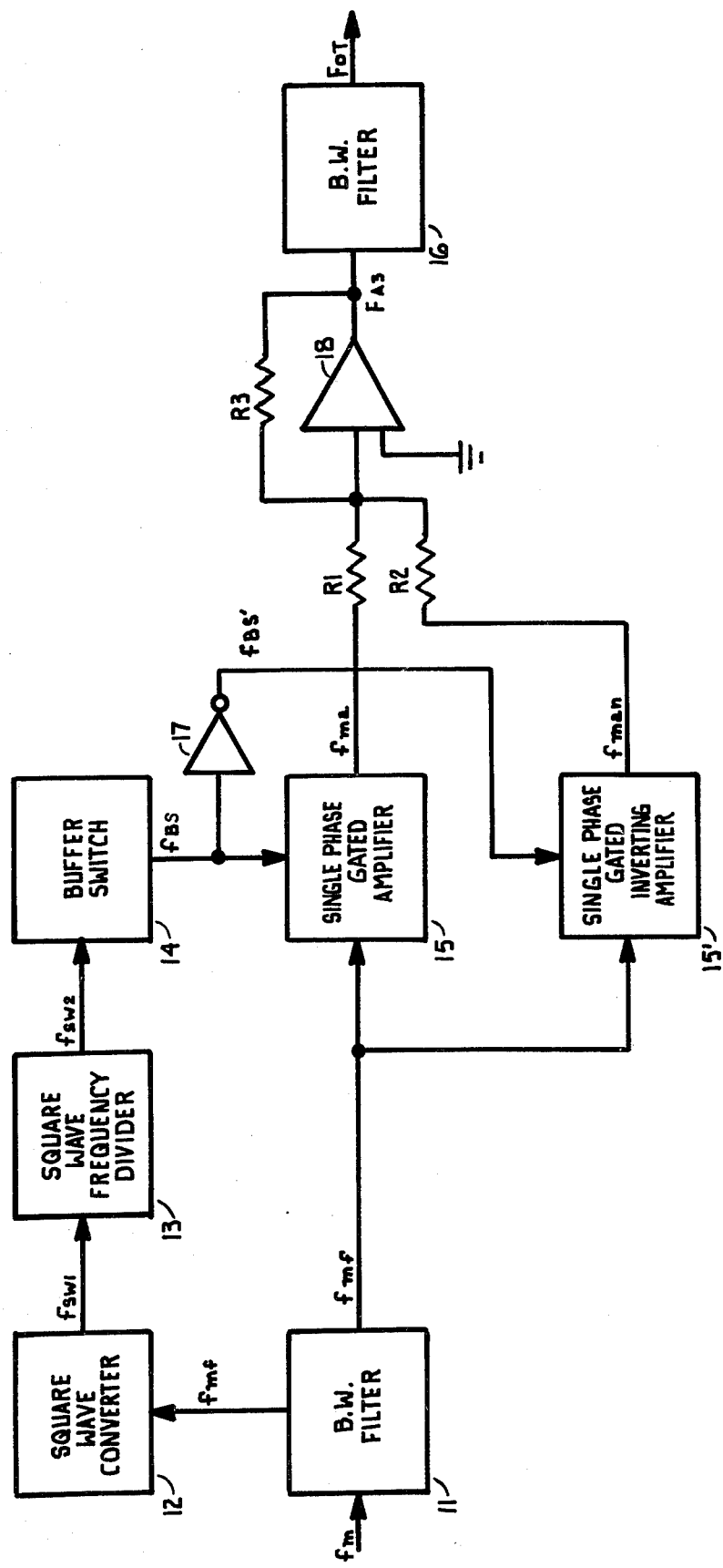
FIG. 2 is a block diagram of an improved fidelity bandwidth compressor.

An improved fidelity bandwidth compressor is illustrated in FIG. 2. In this embodiment, an additional gated single-phase amplifier 15' is used to amplify and invert alternate positive half cycles of filtered information signal $f_{mf}$ in a manner now to be described. Referring to FIGS. 2 and 3, buffered square wave drive signal $f_{BS}$ used to control gated amplifier 15 is inverted by inverting buffer amplifier 17 to produce control signal $f_{BS}'$ for controlling gated amplifier 15'. Gated amplifier 15' is a single phase inverting amplifier responsive only to positive-going input signals coincident with the positive level of $f_{BS}$, inverting the positive signals to negative signals. Thus the output signal $f_{man}$ from amplifier 15' is a train of negative going analog signals similar to the positive excursions of signal $f_{ma}$, but occurring only during every other positive signal pulse of $f_{mf}$, i.e., at half the frequency of the positive signal pulses in $f_m$.

Signal $f_{man}$ is summed with signal $f_{ma}$ by a summing operational amplifier 18. The amplitude of the output signal FA3 from the operational amplifier is given by the equation $FA3 = f_{ma}(R3/RI) + f_{man}(R3/R2)$ (equation 1). As shown in FIG. 3, signal $F_{A3}$ comprises a train of positive and negative-going signals similar to the positive and negative excursion of signal $f_{mf}$ but occurring only during positive excursions of information signal $f_{mf}$. Signal $F_{A3}$ at the output of operational amplifier 18 is coupled to the input of a bandpass filter 16 having a center frequency equal to one-half the fundamental frequency of the information signal $f_{mf}$. The action of bandpass filter 16 on signal $F_{A3}$ results in a quasi-sinusoidal waveform $F_{OT}$ at the output of the bandpass filter. In order to divide an input signal by $N=2$, it is preferable to invert alternate positive going signals to negative going signals in order to get an intermediate outgoing signal with a symmetrical shape at the divided frequency. If a divider was used with an odd division ratio, such as $N=3$, a negative going excursion would naturally occur in the input signal at the temporal midpoint between selected positive going excursions of the divided outgoing signal. There would be no need to invert any positive going input excursions, and every third negative excursions would be amplified with no necessary phase inversion. The use of this type of division process is therefore not intended to be limited to even division ratios, but is described as such because of the operational simplicity and preferred mode of operation.

To reconstruct an information signal which has been compressed in frequency by the methods herein described, a bandwidth expander of the type shown in FIG. 6 may be employed. As shown in FIG. 6, compressed bandwidth signal $F_{OT}$ is applied to the A and B inputs of two-quadrant analog multiplier 20. The signal at output terminal C of multiplier 20 is given by the equation $V_C = kV_A V_B$ (equation 2); where $V_C$ is the output voltage, $V_A$ is the input voltage at terminal A, $V_B$ is the input voltage at terminal B, and k is the gain constant of the multiplier. Since input terminals A and B are connected together in the multiplier configuration shown in FIG. 6, input signals are either both positive (quadrant 1) or both negative (quadrant III) and therefore multiplier 20 need only have a two-quadrant multiplication capability.

Now for a compressed bandwidth signal $V_{OT}$ having a quasi-sinusoidal waveform, the instantaneous amplitude is given by $V_{OT} = E_P \sin w + $ (equation 3) where wt is the angular frequency and $E_P$ is the peak amplitude which, in general, is a function of time, but is slowly varying with respect to the angular frequency w. Substituting equation 3 into equation 2 gives the expression for the output voltage Eot from the multiplier: $E_{OT} = k E_P^2 \sin^2 wt$ (equation 4). Substituting the trignometric identity $\sin^2 wt = 1 - \cos 2wt/2$ into equation 4 gives: $E_{OT} = k E_P^2 (1 - \cos 2wt)/2$ (equation 5). $E_{OT}$ comprises a sinusoidal signal having a fundamental frequency 2w which is twice the fundamental frequency of the compressed signal $F_{OT}$ with an amplitude proportional to the instantaneous amplitude $E_P$ of $F_{OT}$, and a superimposed direct current voltage level. Therefore, for a compressed bandwidth signal which are originally produced by dividing the frequency of the information signal by two, the operation of the bandwidth expander shown in FIG. 6 results in restoring the fundamental frequency of the transmitted signal to its original value. The d.c. component superimposed on the recovered signal may be removed by capacitively coupling the signal to its final destination.

It is evident from the description of the operation of analog multiplier 20 that the multiplier, configured as shown in FIG. 6, functions as a frequency doubler. The frequency doubling function may also be performed by such non-linear elements such as diodes, or alternatively numerous other frequency doubling circuits are suitable for use in place of analog multiplier 20.

In general, where the frequency compressors previously described herein employ n cascaded flip-flops to divide the predominant fundamental component by a factor of $2^n$, the corresponding bandwidth expander similar to the one shown in FIG. 6 will require n cascaded frequency doublers 20.

Figure 4:
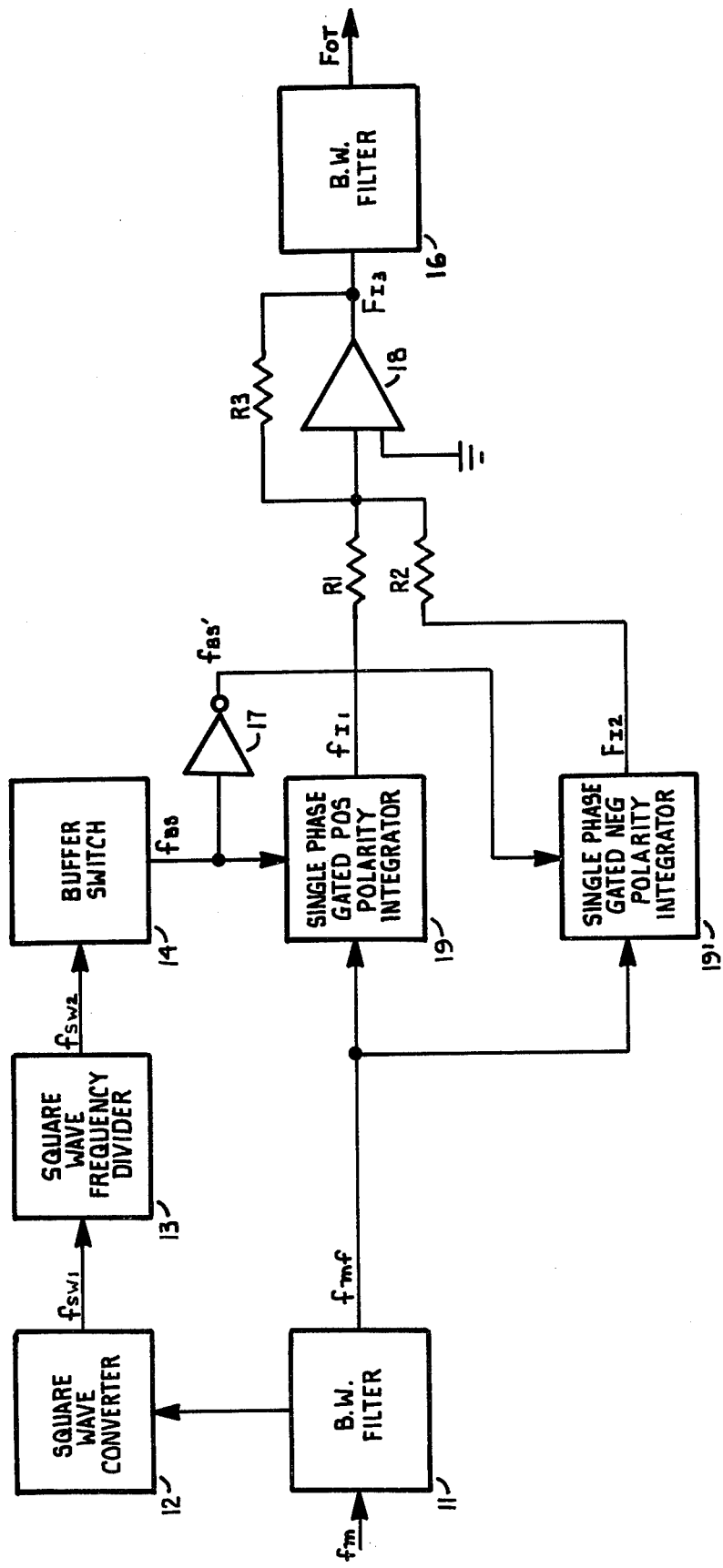
FIG. 4 is a block diagram of an alternate embodiment of an improved fidelity bandwidth compressor.
Figure 9:
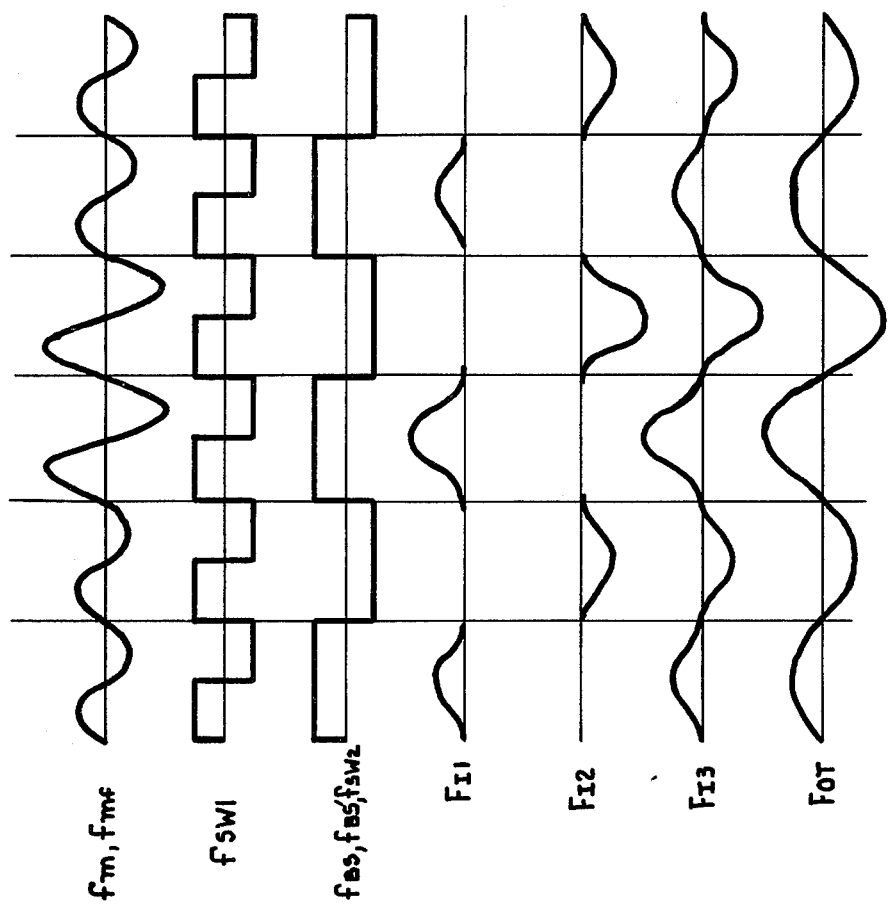
FIG. 9 is a diagram of waveforms for the alternate improved embodiment bandwidth compressor shown in FIG. 4.

Referring now to FIG. 4, another embodiment of an improved bandwidth compressor is shown. The operation of that embodiment is analogous to the operation described for the improved bandwidth compressor of FIG. 2, up to the point where gated single phase amplifier 15 and inverting single phase amplifier 15 in FIG. 2, are replaced with gated, complementary unipolar integrators, 19 and 19' in FIG. 4. As illustrated by the waveforms in FIG. 9, the function of integrators 19 and 19' is to make the waveform which is the composite sum of signals $F_{11}$ and $F_{12}$ outputted by integrators 19 and 19' more closely approximate a sine wave. The action of summing amplifier 18 and filter 16 following integrators 19 and 19' is exactly the same as has been described for the bandwidth compressor shown in FIG. 2.

Figure 5:
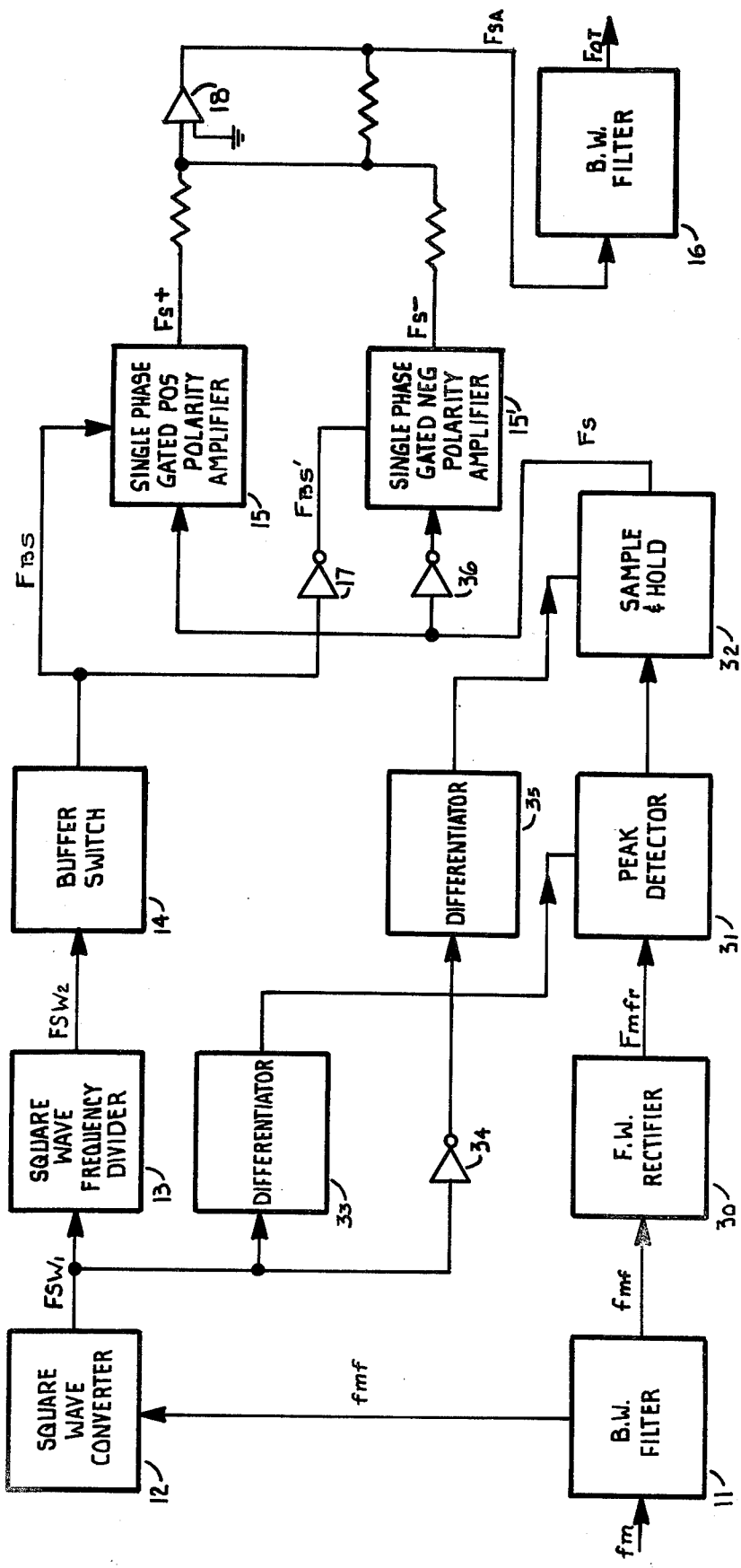
FIG. 5 is a block diagram of another embodiment of the bandwidth compressor.
Figure 10:
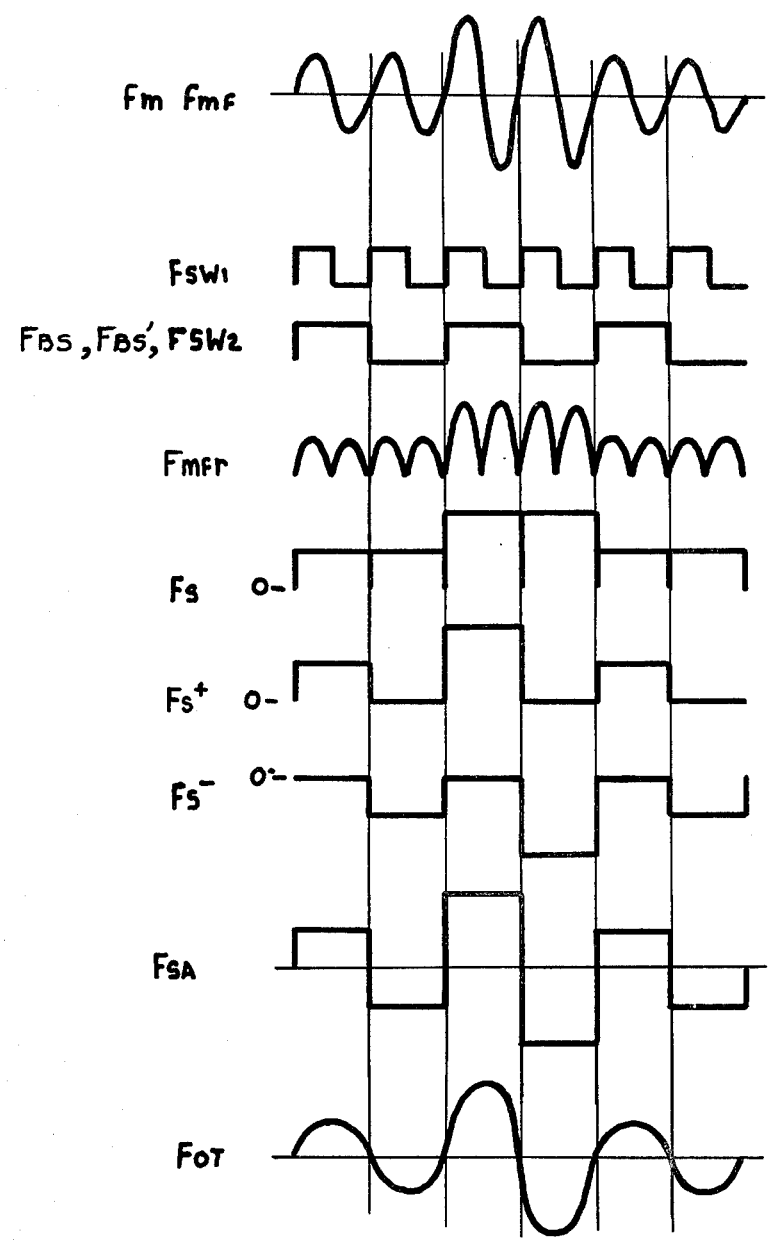
FIG. 10 is a waveform diagram for the embodiment of FIG. 5.

Another embodiment of the bandwidth compressor is shown in FIG. 5. The waveforms associated with the signals of the compressor shown in FIG. 5 are shown in FIG. 10. The operation of the circuit elements in the parallel circuit paths up to the output of buffer switch 14 and to the output of bandwidth filter 11 is exactly as has been previously described for the embodiment shown in FIG. 2.

Referring now to FIG. 10, filtered information signal $f_{mf}$ at the output of bandwidth filter 11 is coupled to full-wave rectifier 30 producing full-wave rectified waveform $F_{mfr}$ as shown in FIG. 10. Signal $F_{mfr}$ is coupled to the input of peak detector 31, which peak detector generates a voltage proportional to the peak value of $F_{mfr}$ occurring during the positive half cycle of $FSW_2$. Peak detector 31 is reset by signal $FSW_1$ generated by differentiating the leading edge of $FSW_1$ with differentiator 33. The output signal from peak detector 31 is gated into sample and hold circuit 32 by sample and hold signal $FSW_1$, generated by differentiating the trailing edge of $FSW_1$ through use of inverter 34 and differentiator 35. Output signal $F_S$ from sample and hold circuit 32 is thus a rectangular waveform unipolar signal. Sample and hold circuit output signal $F_S$ is coupled directly to gated amplifier 15, and also through inverting amplifier 36 to gated amplifier 15'. Gated amplifier 15 is enabled by buffered signal $F_{BS}$ in synchronization with the positive half cycles of $FSW_2$. Thus, sample and hold signal $F_S$ is amplified during the positive excursions of $FSW_2$.

Buffer switch signal $F_{BS}$ is also connected to the input of inverter 17, resulting in a positive-going output signal $F_{BS}'$ during the negative excursions of $F_{BS}$. Signal $F_{BS}'$ is used to enable gated amplifier 15', which is driven by inverted sample and hold signal $F_S'$ occurring at the output of inverting amplifier 36. The outputs of gated amplifiers 15 and 15' are summed by operational amplifier 18 to produce a bipolar square wave $F_{SA}$. Signal $F_{SA}$ is in turn coupled to bandwidth filter 16 to produce filtered bipolar signal $F_{OT}$.

It is also possible to use the peak detector and hold circuits on preselected pulses of the information signal, such as every other positive or negative pulse, with or without using a full-wave rectifier. The maximum or minimum peak over a desired period may be easily retained by sample and hold circuits when the full-wave rectifier is incorporated, and is the desired embodiment for descriptive purposes.

The bandwidth compression and expansion methods herein before described each employ a single bandwidth bandpass filter at the output of the bandwidth compressor. While such compression and expansion techniques are adequate for information signals comprised mainly of a fixed fundamental frequency, sinusoidal signal modulated by lower frequency components, a more general class of information signals comprises signals with a varying fundamental frequency. To accommodate the latter more general class of information signals, the embodiment shown in FIG. 7 may be employed. In the multi-channel bandwidth compressor shown in FIG. 7, a plurality of bandwidth compressors are driven by the information signal $f_m$. For simplicity of illustration, the rudimentary embodiment bandwidth compressor of FIG. 1 is shown as the basic compressor in FIG. 7. It is obvious, however, that any of the previously described embodiments of the bandwidth compressor could be used in the technique shown in FIG. 7. Also for ease of description, it is assumed that the square wave frequency dividers 13 in FIG. 7 are single flip-flops, resulting in a frequency division by a factor of 2. Thus, if an input bandwidth filter 11 is tuned to a frequency $f_1$, the compressed bandwidth output filter 16 is tuned to $f_{\frac{1}{2}}$.

Now, if the information signal $f_m$ comprises a number of predominant frequency components $f_1, f_2 \ldots f_n$, each modulated by frequency components lower than the corresponding predominant frequency, it is clear that a plurality of bandwidth compressors as shown in FIG. 7, each of which is tuned to $f_1, f_2, \ldots f_n$, respectively, may be used to compress each range of signal frequencies centered about $f_1, f_2, \ldots f_n$. The respective compressed bandwidth signals may then be summed in an amplifier 18 to produce a composite compressed frequency signal.

In order to tune a filter to the center of a low frequency divided signal which slowly varies in frequency, it is also possible to heterodyne the information signal with a high frequency carrier signal, and filter off the desired side band. The side band can then be divided by N, and the filter tuned to the smaller bandwidth segement with the center frequency at 1/N. For example, a signal varying between 100 Hz and 1000 Hz could be heterodyned with a 10 KHz carrier, and the single side band 10.1 to 11 KHz selected. The filter for this single side band when divided by 2 could be tuned to a center frequency of approximately 5.55 KHz.

Figure 8:
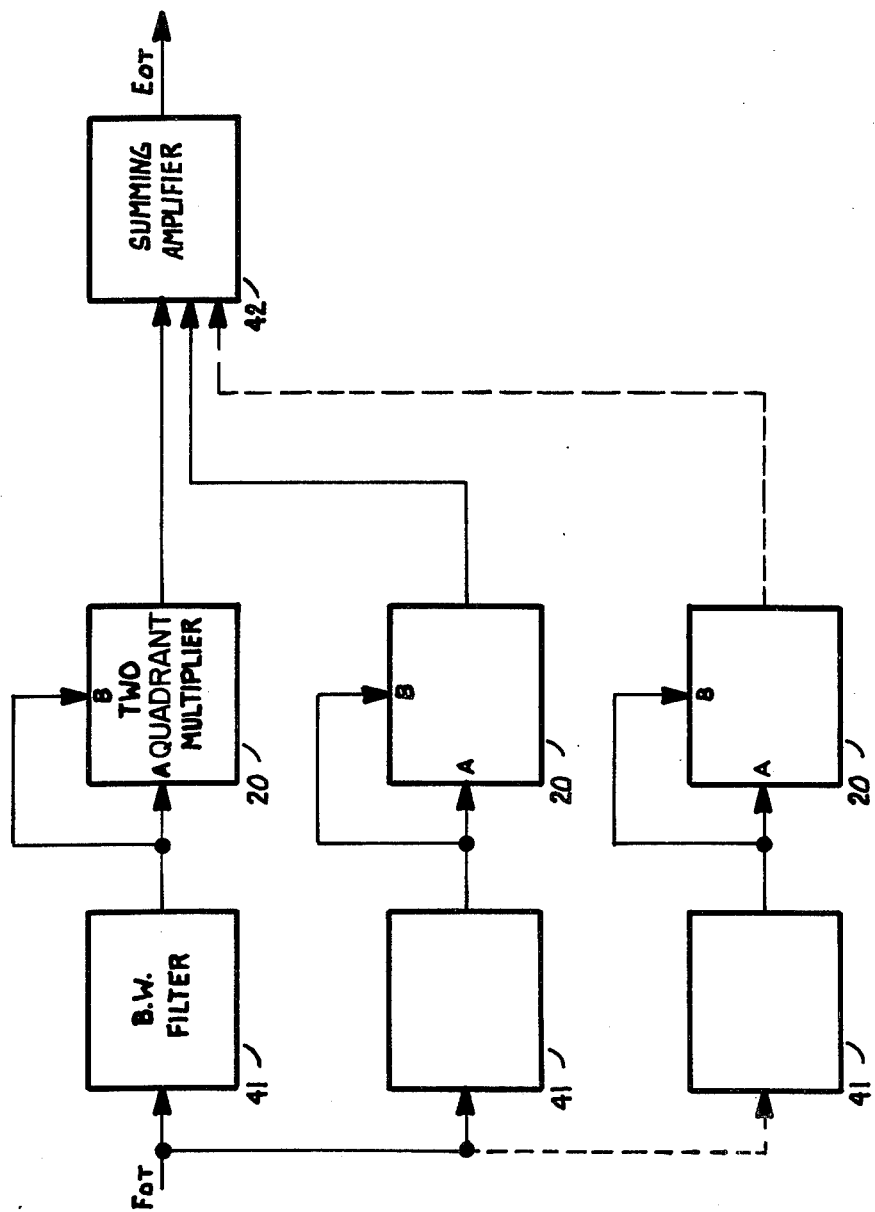
FIG. 8 is a block diagram of a bandwidth expander employing a plurality of frequency expansion bands.

To reconstruct an information signal which has been compressed in frequency by a multi-channel bandwidth compressor similar to that shown in FIG. 7, a bandwidth expander of the type shown in FIG. 8 may be employed. As shown in FIG. 8, the compressed bandwidth signal $F_{ot}$ is coupled to a plurality of paralleled bandwidth filters. For each bandwidth filter in the bandwidth compressor preceding the bandwidth expander, there is a corresponding bandwidth filter in the bandwidth expander tuned to the same center frequency, for a total of n filters. Following each bandwidth filter in the multi-channel bandwidth expander is a bandwidth expander 20 identical in operation to the basic bandwidth expander of the type shown in FIG. 6, which operation has been described above. The expanded bandwidth signal from each expander 20 is coupled to an input of summing amplifier 42. Thus the output summing amplifier 42 is a composite signal comprising the sum of n expanded bandwidth signals resembling the n bandwidth signals into which the original information signal was divided before individual compression, summing and transmission to the multi-channel bandwidth expander.

When a complicated communications signal has a narrow enough bandwidth so that the signal within that bandwidth approaches a sine wave, conventional dividing techniques can be used for signal compression. However, such conventional filtering techniques can be costly in that many new and separate filters would have to be used. Consequently, such a method, while useful, has significant practical limitations. Additionally, it is further questionable that such conventional filters would be useful without electrically "matching" the characteristics of one filter to another in order to insure faithful processing of the signal waveforms.

Figure 11:
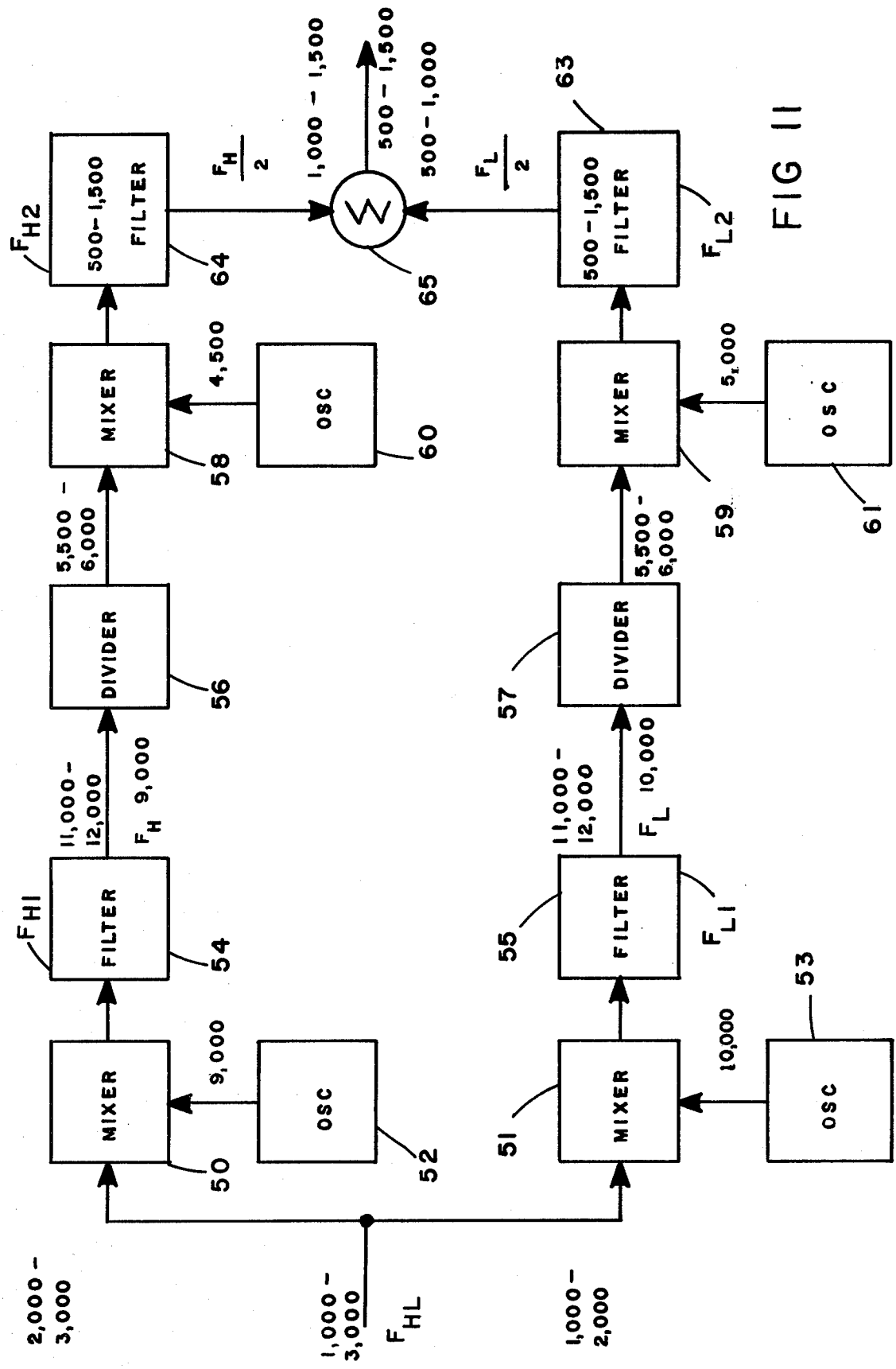
FIG. 11 is a block diagram of a yet still further embodiment of a bandwidth compressor.
Figure 12:
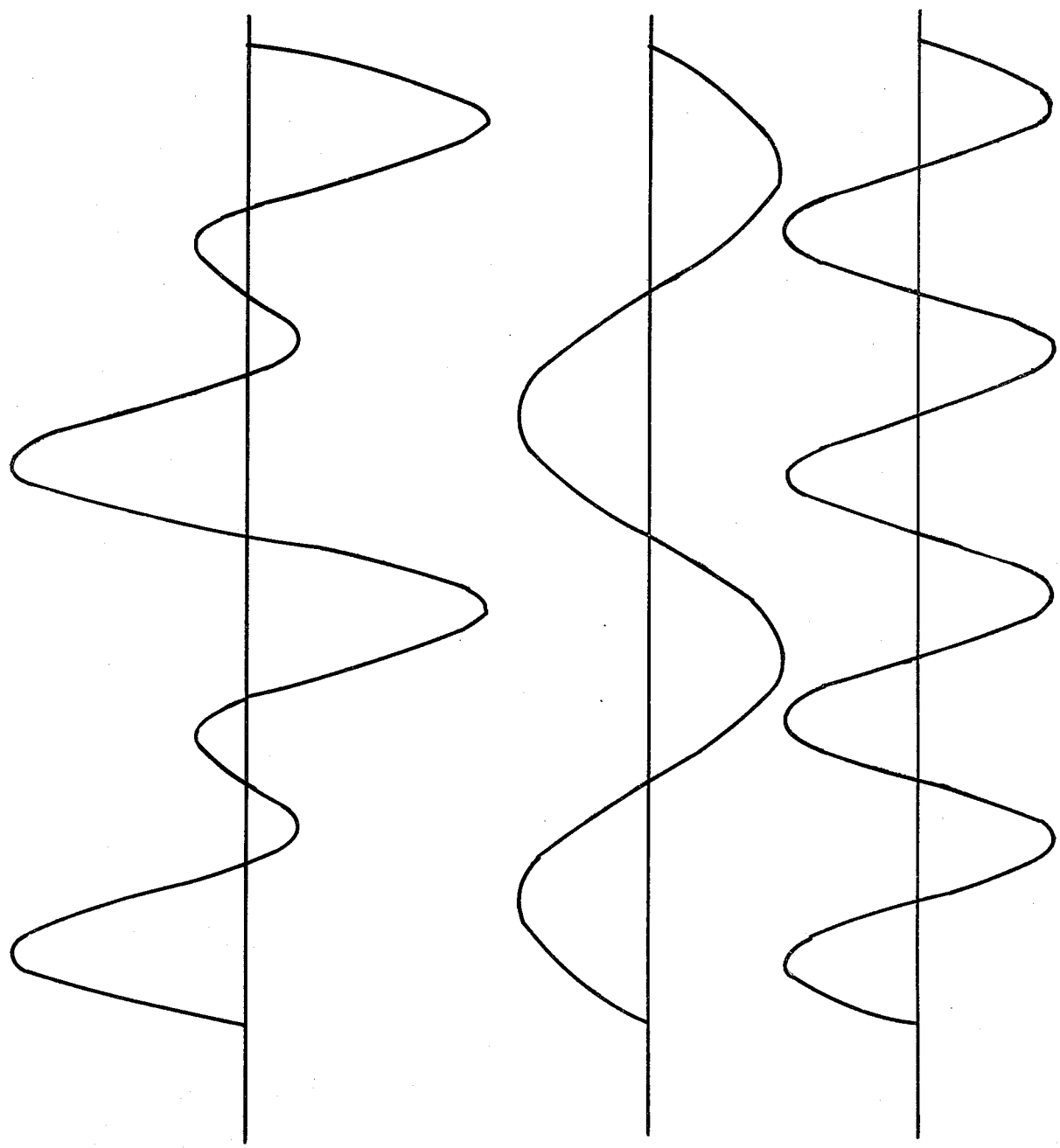
FIG. 12 is a diagram of waveforms for the further embodiment of the present invention shown in FIG. 11.

Referring now to FIGS. 11 and 12, an important method for achieving bandwidth compression is presented by utilizing a bandwidth filtering technique which uses a single bandwidth filter (not shown) and, thereby eliminates the need for numerous different bandwidth filters. For example, if two very simple sine wave signals, $F_L$ and $F_H$, as shown in FIG. 12, were combined, a more complicated signal $F_{HL}$ would be formed. If $F_H$ was sine wave of 2,400 Hz and $F_L$ was a sine wave of 1,200 Hz and the combined signal $F_{HL}$ was input to the device shown in FIG. 11, containing both of the fundamental frequencies, 2,400 Hz and 1,200 Hz and the sum and the difference of those two fundamental frequencies, 600 Hz and 3,600 Hz. These four (4) frequencies are input to the circuit shown in FIG. 11 and initially are fed into a pair of mixers 50,51 having a corresponding pair of oscillators 52,53 having frequencies of 9,000 Hz and 10,000 Hz, respectively. The output of the mixers 50,51 would be fed into the filters 54,55, which although electrically distinct, the filters 54,55, as a practical matter, might occupy a single physical structure or housing. The outputs of the bandwidth filters, which, of course, have a relatively narrow bandwidth of 1 KHz, extending from 11,000 Hz to 12,000 Hz, would be $F_H + 9,000$ Hz and $F_L + 10,000$ Hz, respectively. The output of filter 54 would, of course, be a sine wave resembling $F_H$, but at the higher frequency of 11,400 Hz. This is, of course, due to the well known characteristic of a conventional filter, such as an LC or so-called "tank" circuit, which when a non-sinusoidal waveform is input into it, it will output a sinusoidal waveform.

Correspondingly, the output signal of filter 55 would be a sine wave resembling the input frequency, $F_L + 10,000$ Hz, but at a frequency now of 11,200 Hz. The output signals of filters 54,55 are then fed into a pair of frequency dividers 56,57 which divide the corresponding frequencies in half, that is $(F_H + 9,000 \text{ Hz})/2$ and $(F_L + 10,000 \text{ Hz})/2$, respectively, the resulting bandwidth being, in each case, 5,500-6,000 Hz. Both the output signals from the frequency dividers 56,57 are input into a pair of mixers 58,59 having a corresponding pair of local sine wave oscillators 60,61 having output signal frequencies of 4,400 Hz and 5,000 Hz, respectively. Following this, the outputs of the mixers 58,59 are input into conventional filters, $F_{H2}$ and $F_{L2}$, respectively. Filters $F_{H2}$ and $F_{L2}$ have bandwidth of 500-1,500 Hz. Consequently, the output signal of $F_{H2}$ will be the signal $F_H$ at the divided frequency; namely: $F_H/2$ or 1,200 Hz. Correspondingly, the output of filter $F_{L2}$ would be the signal resembling $F_L$ at the divided frequency which, in the present case, is $F_L/2$ or 600 Hz.

Thereafterwards, $F_L/2$ and $F_H/2$ are summed together in conventional fashion by the summing element 65, and the resultant signal will be $F_{HL}/2$ or $F_{HL}$ compressed by a factor of 2.

It should also be noted at this time, that this method could also be used by lowering the frequency of the individual narrow bandwidth segments of signal prior to dividing or compressing the individual segments. Following signal filtering via filters 54,55, each narrow bandwidth segment could be mixed with the desired carrier, and a lower frequency signal sideband filtered off. Thereafterwards, the lower frequency segments could then be treated individually.

In the expansion of a compressed bandwidth signal, if the compressed signal is separated into small bandwidth segments in which the signal therein approaches a sine wave, frequency multipliers such as a two quadrant multiplier or a full wave rectifier can be used on the individual bandwidth segments with minimal operational error. The frequency multiplied bandwidth segments can then be recombined or summed to form the expanded bandwidth signal.

For economy in producing narrow bandwidth segments for frequency multiplication or bandwidth expansion, the technique of using several individual, but electronically identical filters can also be used in the same manner as illustrated in compression.

Each filter could select a separate portion of the wider bandwidth signal by using a unique carrier or mixing signal prior to each filter. Each filter could then filter off a single side band which would be a unique portion of the original signal. The narrow bandwidth side band could then be multiplied.

In many cases it would be desirable to multiply this segment several times if there was an original compression factor greater than two. Between each multiplier it would be desirable to use a bandwidth filter. In the case where the signal is initially multiplied by two, a bandwidth filter tuned to a center frequency of approximately twice that of the signal before multiplication should be used. This would reconform the multiplied signal to a quasi sine wave for input to the next multiplier, and would eliminate intermodulation products which might otherwise develop.

Figure 13:
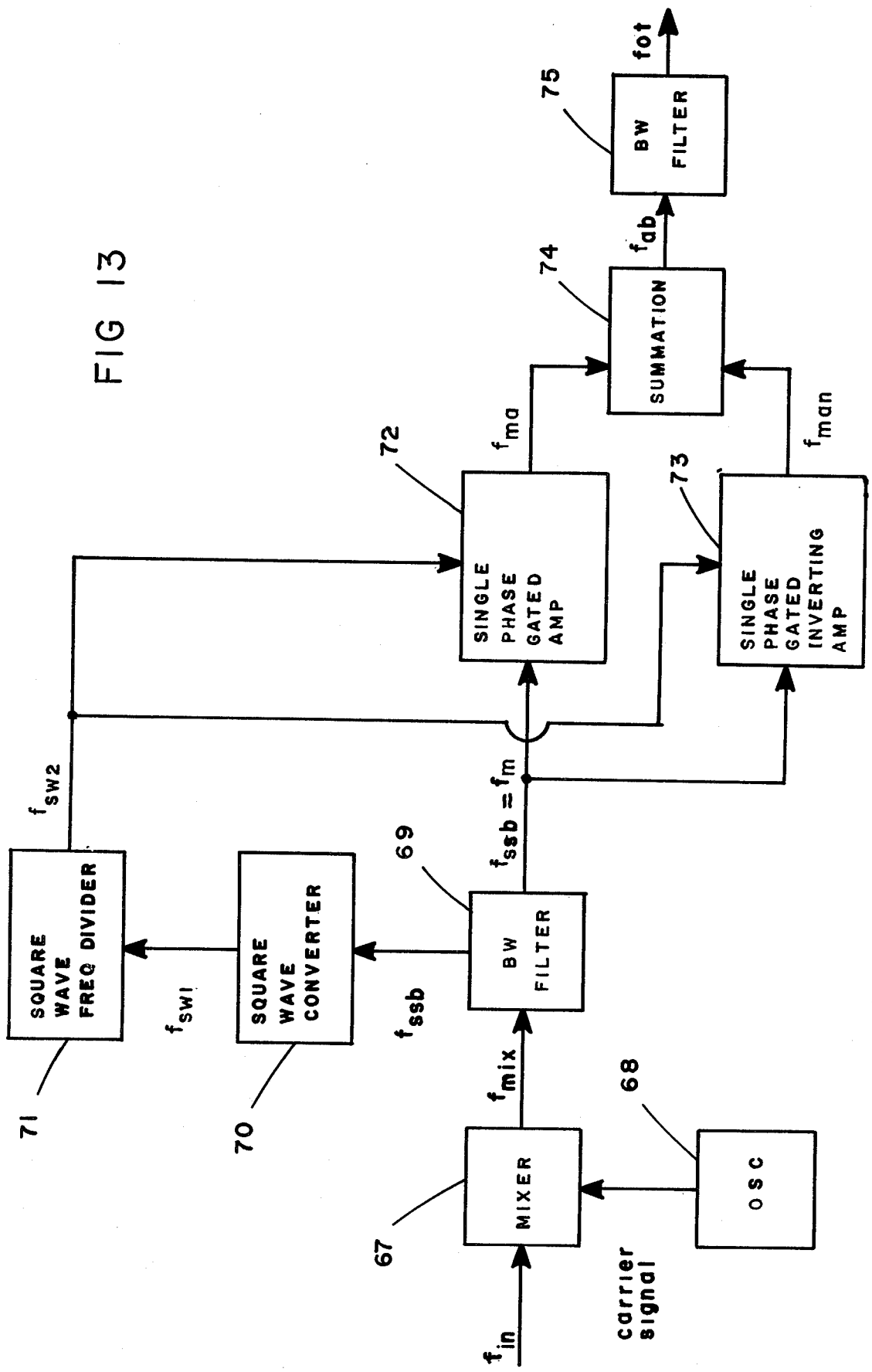
FIG. 13 is a block diagram of another embodiment of a bandwidth compressor.

With reference now to FIG. 13, as yet still another embodiment of the present invention is shown and described. Basically, this circuit generally shown at 66, employs the theory or methodology that the separation of a complicated communications signal into small bandwidths insures that a close approximation of a sine wave can be ultimately achieved. Should the signal approach a true sine wave, conventional methods of converting the sine wave into a square wave and subsequently frequency-dividing the square wave would work well in frequency division methodology. However, if the signal is not a close approximation of a true sine wave, such as might be the situation if two elementary sine waves were combined, the signals would add and subtract in a manner which would not permit a conventional frequency divider to operate properly at all times. The reason is understandably simple when one realizes that as the amplitude of —one of the signals is varied with respect to the other signal, at frequencies of, say, 1,500 Hz and 1,000 Hz, false zero crossings might result. If such would be the case, then the conventional frequency divider seeing the two signals summed together at 2,500 Hz might appear large enough to produce false triggering of the conventional flip-flop, or initially one signal might appear larger, and then the second signal, or even the difference frequency of 500 Hz might cause false triggering.

The instant method proposed by the present invention herein is to hetrodyne the input signal with a higher frequency carrier signal than present in the input signal, filtering off a side band, and then dividing or compressing the side band signal bandwidth.

After the side band bandwidth is compressed, it can then be again returned to the frequency range by once again hetrodyning the compressed bandwidth with an appropriate carrier and filtering off a sideband corresponding to the signal resulting from directly compressing the bandwidth of the original input signal.

For example, a complicated signal of two elementary signals with a fundamental frequency of 1,000 Hz, which is varied in amplitude, could be hetrodyned with a 10 KHz carrier signal and the single upper side band filtered off. The resultant signal would appear to be a closer approximation to a sine wave, with the information signals at 1,000 Hz and 1,500 Hz causing some distortion, relating to the frequencies of 11,000 Hz and 11,500 Hz. Even if an additive frequency of 12,500 Hz occurred, the resultant signal would not cross the zero level significantly more often, and cause extréme triggering of the frequency divider, since ordinarily the number of zero crossing would be 11,000 to 11,500 Hz per second anyway.

This technique is illustrated in FIG. 13 where input signal $f_{in}$ is mixed by a mixer 67 with a carrier signal generated by an oscillator 68 resulting in output signal $f_{mix}$. A bandwidth filter 69 then selects a single side band $f_{ssb}$ which corresponds to $f_m$ in FIG. 2 which is basically similar in the remaining part of the circuit shown in FIG. 13. The signal wave forms output from the bandwidth filter 69 are the same as shown in FIG. 3. Signal $f_{ssb}$ then is converted by a square wave converter 70 to a square wave $f_{sw1}$ and then divided by the square wave frequency divider 71 to $f_{sw2}$. Square wave divided signal $f_{sw2}$ activates the single phase gated amplifier 72 during one phase, and then keys it off in the opposite phase. In turn, $f_{sw2}$ keys the single phase inverting amplifier 73 on when the first amplifier 72 is off, and off when the first amplifier 72 is on. The single phase gated amplifier 72 outputs signal $f_{ma}$ and the single phase gated inverting amplifier 73 outputs signal $f_{man}$. Signals $f_{ma}$ and $f_{man}$ are then summed by the summing element 74 to form signal FA3 which is then filtered by the bandwidth filter 75 to form signal FOT.

This technique allows using larger bandwidth segments to efficiently operate with a square wave frequency divider. As the bandwidth segment becomes larger the importance of hetrodyning the signal with a carrier signal and obtaining a higher frequency single side band becomes increasingly desirable to insure proper operation of the square wave frequency divider.

What I claim is:

1. An apparatus for compressing the frequency bandwidth of analog signals of varying amplitude and/or frequency and having modulation information thereon, comprising:
   a. a first bandpass filter (11) tuned to a predominant frequency of the information signal (fm), the input terminal of said filter connected to receive said information signal;
   b. a square wave converter (12) for converting the output signal (fmf) from the first bandpass filter to a bipolar, quasi-square wave signal (fSW1) at the fundamental frequency of said information signal, the input of said square wave converter is coupled to the output of said first bandpass filter;
   c. a square wave frequency divider (13) comprising n cascaded flip-flops, where n is at least one, for converting the quasi-square wave signal (fSW1) to a frequency-divided square-wave signal (fSW2) at a frequency equal to $\frac{1}{2}$n times the frequency of the quasi-square wave signal (fSW1), the input of said square-wave frequency divider (13) is coupled to the output of said square wave converter (12);
   d. a non-inverting unipolar gated amplifier (15) an input terminal of which is coupled to the output of said first bandpass filter (11);
   e. a buffer switch (14), the input of which is coupled to the output of said square wave frequency divider (13) and the output of which buffer switch is coupled to the gate input of said gated amplifier (15) for selectively gating on the gated amplifier in response to one polarity of said quasi-square wave; and
   f. a second bandpass filter (16) tuned to the frequency of said frequency divided square wave, the input of said second bandpass filter is coupled to the output of said gated amplifier whereby only one polarity portion of said output signal from said first bandpass filter is selectively passed through said second bandpass filter.

2. A bandwidth compression and restoration system comprising in combination with the bandwidth compressor of claim 1, means for coupling the compressed bandwidth signal to a bandwidth expander (20), said bandwidth expander comprising a series of n where n, is at least one, cascaded analog multiplier circuits each configured as squaring circuits.

3. The apparatus of claim 1 further comprising,
   at least one additional parallel bandwidth compression channel having:
   a. a third bandpass filter tuned to a different predominant frequeny of the information signal;

b. a fourth bandpass filter (16-2) tuned to a fraction of the third bandpass filter center frequency; and
c. a summing amplifier (18) the input terminals of which are coupled to the outputs of the bandwidth compression channels for summing the output signal of the first bandwidth compressor with the output of each additional bandwidth compression channel thereby to produce a compressed output signal.

4. The apparatus of claim 1 further comprising:
a. an inverting unipolar gated amplifier (15') the input terminal of which is coupled to the output of said first bandpass filter (11);
b. an inverter (17) the input of which is coupled to the output of said buffer switch (14), and the output of which inverter is coupled to the gate input of the inverting unipolar gated amplifier for gating on the inverting unipolar amplifier in synchronization with the polarity of the frequency divided square wave signal which is opposite to the frequency divided square wave signal which gates on the non-inverting gated amplifier; and
c. a summing amplifier (18) the input terminals of which are coupled to the outputs of the non-inverting amplifier (15) and the inverting amplifier (15'), respectively and the output of which is coupled to said second bandpass filter (16).

5. The apparatus of claim 4 wherein, said gated amplifiers are converted into gated integrators.

6. An apparatus for compressing the frequency bandwidth of signals having modulation information thereon comprising:
a. a first bandpass filter (11) tuned to a predominant frequency of the information signal, the input terminal of said filter connected to receive said information signal;
b. a square wave converter (12) for converting the output signal from the first bandpass filter to a first bipolar, quasi-square wave signal, the input of said square wave converter coupled to the output of said first bandpass filter;
c. a square wave frequency divider (13) for converting the first quasi-square wave signal to a second square wave signal at a frequency equal to $\frac{1}{2}^n$ times the frequency of said first, quasi-square wave signal, the input of said square wave frequency divider coupled to the output of the square wave converter;
d. a full wave rectifier circuit (30) coupled to the output of said first bandpass filter;
e. a peak detector circuit (31) coupled to the output of said full wave rectifier circuit;
f. a sample and hold circuit (32) coupled to the output of said peak detector circuit;
g. a gated non-inverting amplifier (15) responsive to positive polarity signals coupled to the output of said sample and hold circuit;
h. an inverter (36) coupled to the output of said sample and hold circuit;
i. a gated non-inverting amplifier (15') responsive to negative polarity signals coupled to the output of said inverter;
j. a summing amplifier (18) coupled to the outputs of the two gated amplifiers (15, 15');
k. a second bandpass filter (16) coupled to the output of said summing amplifier;
l. a first differentiator (33) coupled to the output of said square wave frequency divider and the output of which is coupled to the reset pulse input of said peak detector (31) for resetting the peak detector at the leading edge of the first, quasi-square wave signal;
m. a first inverter gate (34) coupled to the output of said square wave frequency divider;
n. a second differentiator (35) coupled to the output of said inverter gate (34) and the output of which differentiator is coupled to the hold pulse input of the sample and hold circuit (32) for holding the amplitude of the signal at the input of the sample and hold circuit prior to the trailing edge of the first, quasi-square wave signal;
o. a buffer switch (14) coupled to the output of the square wave frequency divider (13) the output of which buffer switch is coupled to the gate input of said positive polarity non-inverting amplifier (15); and
p. a second inverter gate (17) coupled to the output of the buffer switch (14), the output of said second inverter gate coupled to the gate input of said negative polarity non-inverting amplifier (15').

7. A bandwidth compression and restoration system comprising in combination with the bandwidth compressor of claim 6, means for coupling the compressed bandwidth signal ($F_{OT}$) to a bandwidth expander (20) and a bandwidth expander comprising a series of n, where n is at least one, cascaded analog multiplier circuits each configured as squaring circuits.

8. The apparatus of claim 6 further comprising at least one additional parallel bandwidth compression channel having:
a. a first bandpass filter (11-1) tuned to a different predominant frequency of said information signal;
b. a second bandpass filter (16-1) tuned to an integer fraction of the first bandpass filter center frequency; and
c. a summing amplifier (18), the input terminals of which are coupled to the outputs of the respective bandwidth compression channels for summing the output signals thereof.

9. A bandwidth compression and restoration system comprising, in combination the bandwidth compressor of claim 8, means for coupling the compressed bandwidth signal ($F_{OT}$) to a bandwidth expander means, said bandwidth expander means comprising at least two parallel frequency bandwidth expanders each comprising;
a. an input bandpass filter (41) tuned to a particular portion of the frequency spectrum of the input signal; and
b. a series of n, where n is at least one, cascaded analog multiplier circuits (20) each configured as a squaring circuit;
c. and a summing amplifier (41) for summing the outputs of the parallel frequency bandwidth expanders.

10. The method of compressing the frequency bandwidth of signals having modulation information thereon comprising the steps of:
a. heterodyning an information signal with a carrier signal;
b. filtering the heterodyned signal with a first bandpass filter tuned to one of the single sidebands formed by the combination of the information signal and the carrier signal;

c. converting at least a portion of the output signal from the bandpass filter to a quasi-square wave signal;

d. converting the quasi-square wave signal to a square wave signal having a divided frequency which is equal to 1/n times the frequency of the quasi-square wave signal where n is equal to at least two;

e. selectively activating a gated analog amplifier which is responsive to only one polarity of the signal from said bandpass filter only during one polarity phase of divided frequency quasi-square wave signal;

f. selectively activating a gated analog inverting amplifier which is responsive to only the same polarity of the signal from the bandpass filter as said gated amplifier only during the opposite phase of the divided frequency quasi-square wave signal during which time the gated amplifier is off;

g. summing the amplified output signals produced by said gated amplifier and said gated inverting amplifier; and h. filtering the summed output signal with a second bandpass filter tuned to said divided frequency.

11. The method of claim 10 further comprising the steps of integrating and amplifying both polarity signals at the output of the first bandpass filter.

12. The method of bandwidth compressing an electrical input signal (fm), comprising the steps of:

supplying said input signal (fm) to a plurality of parallel filters (11) to produce a plurality of output signals (fmf) which are an approximate analog sinusoidal waveform in more than one sub-bandwidth segment;

selecting only one phase of said input signal;

inverting every other cycle of said one phase;

filtering the resultant analog signal through a bandwidth filter having a center frequency of approximately one-half of the input signal frequency thereby producing an output signal which is a quasi-sinusoidal waveform; and summing the sub-bandwidth segments together.

13. The method recited in claim 12 wherein said input signal is a wide bandwidth signal, including the steps of;

filtering said wide bandwidth signal into a plurality of narrower bandwidth signal portions with a plurality of electrically similar, narrow bandwidth filters, mixing said bandwidth signal with a different carrier frequency prior to filtering by each of said narrower bandwidth filters; and supplying each of the mixed signals to each of said narrower bandwidth filters, thereby filtering out a different narrow bandwidth signal portion of the original input signal.

14. The method of claim 13, further comprising the step of dividing each of the narrow bandwidth signal portions of the original input signal by a frequency divider.

15. The method of claim 14, further comprising the steps of:

heterodyning the original signal with a carrier signal, said carrier signal being different for each narrow bandwidth portion;

filtering out a sideband signal for each bandwidth filter;

recombining each single sideband signal with other narrow bandwidth portions; and summing each of said recombined signals to form a compressed version of the original wide bandwidth signal.

16. An apparatus for dividing the frequency of an analog input signal with a varying amplitude, comprising:

a frequency divider having the input thereof coupled to receive said input signal, said frequency divider adapted for converting said input signal to a second signal having a frequency equal to 1/n times the frequency of the input signal, where n is at least two;

a buffer switch the input of which is coupled to the output of said frequency divider to receive said second signal and which is operative to produce a gating signal, a gated amplifier one input of which is coupled to receive said input signal and a gate input of which is coupled to receive said gating signal, said gated amplifier operative to selectively pass one polarity of said analog input signal directly therethrough when gated on;

said buffer switch having the output thereof coupled to said gate input of said gated amplifier for gating on said gated amplifier in synchronization with only one polarity of the frequency divided signal; and a bandpass filter having the input thereof coupled to the output of said gated amplifier, said bandpass filter tuned to the frequency of said second signal.

17. The apparatus recited in claim 16 wherein, said frequency divider includes, converter means for receiving said input signal for generating a quasi-square wave signal having a frequency equal to the frequency of said input signal, and square wave divider means connected to receive said quasi-square wave signal and to produce said second signal which has the form of a square wave.

18. The apparatus recited in claim 16 including, a second gated amplifier one input of which is coupled to receive said input signal and a gate input of which is coupled to receive said gating signal, said second gated amplifier operative to selectively pass and invert only said polarity of said analog input signal directly therethrough when gated on.

19. An apparatus for compressing the frequency bandwidth of analog input signals having modulation information thereon, comprising:

first bandpass filter means tuned to a predominant frequency of the input signals having the input thereof coupled to receive the input signals;

clipper means for converting the output signal from the first bandpass filter means to a square wave signal and having the input thereof coupled to the output of the first bandpass filter means for reducing the frequency of the square wave signal supplied by said clipper means;

rectifier means coupled to the output of said first bandpass filter means;

peak detector means coupled to the output of said rectifier means;

sample and hold circuit means coupled to the output of said peak detector means;

gated amplifier means responsive to positive polarity signals coupled to the output of said sample and hold circuit means;

gated amplifier means responsive to negative polarity signals coupled to the output of said sample and hold circuit means;

summing means coupled to the outputs of said gated amplifier means;

second bandpass filter means coupled to the output of said summing amplifier means;

differentiator means coupled to receive signals from said clipper means and to supply signals to said peak detector means and to said sample and hold circuit means; and switch means coupled to the output of said frequency divider means for supplying signals to each of said gated amplifier means.

20. A bandwidth comprising method comprising:

supplying an analog input signal, converting said analog input signal to a square wave signal, detecting the power function of selected phases of said analog input signal, amplifying said square wave signal in accordance with the power function of said input signal thereby to produce a proportionally amplified square wave signal which is proportional to the selected phase of said analog input signal, and forcing the proportionally amplified square wave signal through a bandwidth filter tuned to the frequency of the square wave to convert the square wave signal to a sinusoidal signal at a frequency which is reduced relative to said analog input signal.

21. The apparatus recited in claim 1 wherein, said square wave converter comprises a Schmitt trigger circuit.

22. The apparatus recited in claim 1 wherein, said first bandpass filter (11) transmits an alternating bipolar signal, and said non-inverting unipolar gated amplifier (15) is operative to produce an output signal in response to only one polarity signal from said first bandpass filter (11).

23. The apparatus recited in claim 3 including, bandwidth expander means connected to the output of said summing amplifier (18), said bandwidth expander means comprising;

a separate input bandpass filter (41-1) for each bandwidth compression channel and tuned to a particular portion of the frequency spectrum of the information signal of the related bandwidth compression channel, a separate analog multiplier circuit (20-1) respectively connected to each said separate input bandpass filter, and a second summing amplifier (42) connected to all of said analog multiplier circuits to sum the output signals produced thereby.

24. The apparatus recited in claim 23 wherein, each of said analog multiplier circuits is configured as a squaring circuit.

25. The method recited in claim 12 including the step of:

selecting a higher frequency single-sideband signal from said input signal to be operated upon as the input signal.

* * * * *